United States Patent

[11] 3,596,465

| [72] | Inventors | Thomas O. Paine<br>Administrator of the National Aeronautics and Space Administration with respect to an invention of;<br>Donald E. Pryor, Huntsville, Ala.;<br>Benjamin K. Holmes, Huntsville, Ala.;<br>James R. Thompson, Jr., Decatur, Ala.;<br>Charles N. Scott, North Canton, Ohio;<br>William W. Sowa, Medina, Ohio |
|---|---|---|
| [21] | Appl. No. | 18,982 |
| [22] | Filed | Mar. 12, 1970 |
| [45] | Patented | Aug. 3, 1971 |

[54] INFLATABLE TRANSPIRATION COOLED NOZZLE
10 Claims, 3 Drawing Figs.

[52] U.S. Cl. ............................................... 60/271,
139/425 R, 239/265.19, 239/265.43
[51] Int. Cl. ............................................... F02k 1/08,
B63h 11/10, D03d 15/02
[50] Field of Search ........................................... 60/271;
239/265.19, 265.43; 139/425 R, 425 A

[56] References Cited
UNITED STATES PATENTS

| 2,737,019 | 3/1956 | Billman | 239/265.43 (UX) |
| 3,053,488 | 9/1962 | Cox, Jr. | 239/265.43 (X) |
| 3,279,192 | 10/1966 | Hull, Jr. et al. | 239/265.43 (X) |
| 3,482,783 | 12/1969 | Nebiker et al. | 60/271 (X) |

*Primary Examiner*—Allan D. Herrmann
*Attorneys*—L. D. Wofford, Jr., C. C. Wells and G. T. McCoy ABSTRACT: A rocket engine nozzle skirt for increasing the expansion ratio of a main engine nozzle. The skirt is fabricated from a woven, double wall, fabric material which can be folded back around the main nozzle and later inflated to achieve its desired shape. The exterior surface of the nozzle extension is coated with a suitable sealant leaving the inner wall unsealed and with a porosity such that the inflation gas bleeds through to provide transpiration cooling of the nozzle skirt.

RETRACTED POSITION

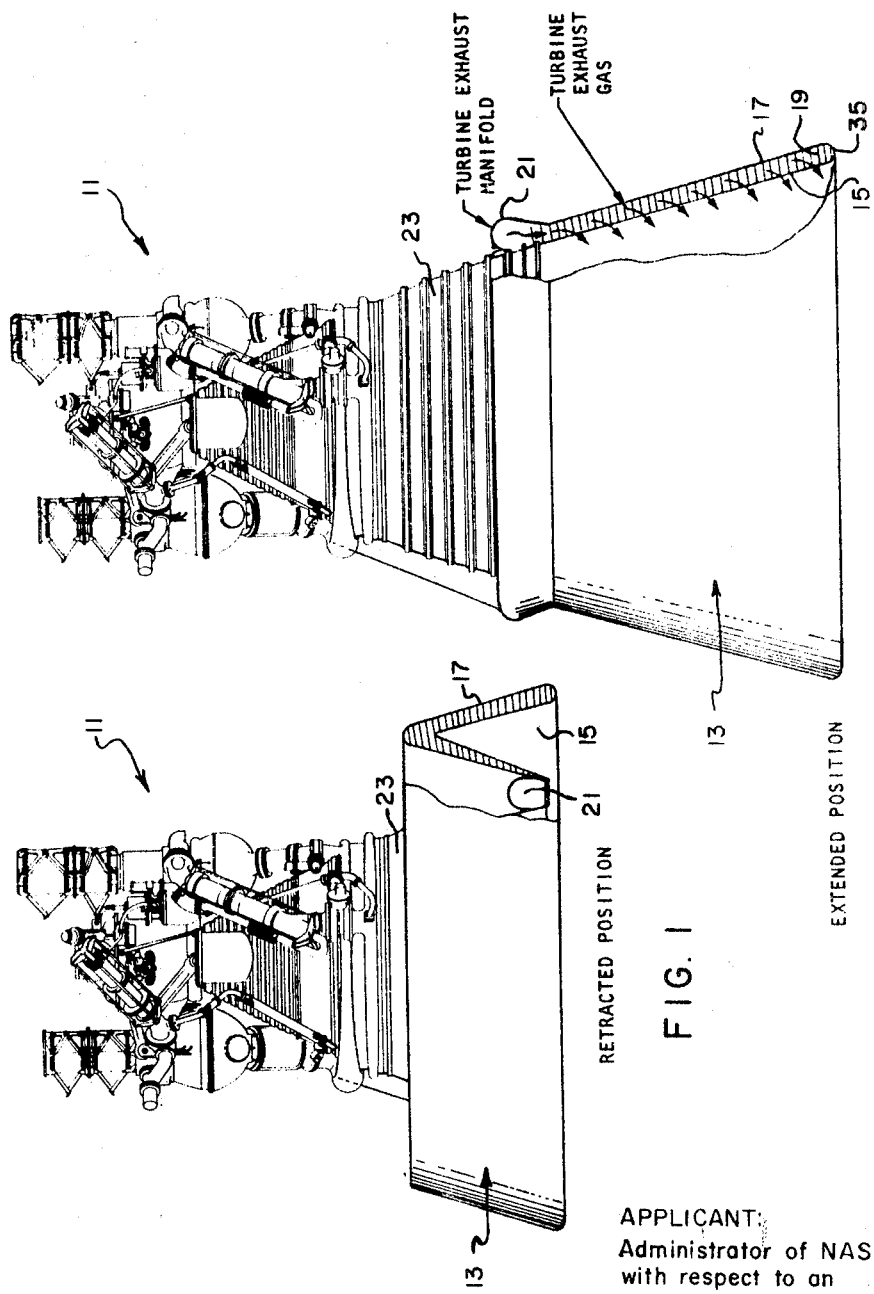

INFLATABLE TRANSPIRATION COOLED NOZZLE

BACKGROUND OF THE INVENTION

1. Field of the Invention

The present invention relates to the field of rocket nozzles and more specifically to an extendable nozzle for a rocket engine.

2. Description of the Prior Art

It is well known that increased thrust performance can be obtained from rocket nozzles as the ambient (back pressure) drops by extending the expansion ratio until the rocket exhaust gases are expanded to exit at a pressure equal to or near ambient pressure. In the vacuum conditions of space, it is theoretically possible to utilize a nozzle of very high expansion ratio and exhaust the rocket engine exhaust gases at vacuum conditions thereby obtaining a high thrust performance. Practically, however, a rocket engine with a fixed nozzle with a very high expansion ratio is very long and has a large exit diameter. Such an engine if installed on an upper stage rocket vehicle would require an interstage length and diameter which is prohibitive. Further, the weight penalties of such a nozzle coupled with the increased weight of the interstage would more than offset the advantages of the high expansion ratio nozzle.

It is therefore, worthwhile to develop a technique to provide upper stage engines with an extendable nozzle skirt which can be stowed about the engine during the boost phase and extended to full length after upper stage separation.

Extendable nozzle skirts have been developed using an elastomeric ablator supported by a woven textile fabric. However, due to the thickness of the ablator required for cooling the textile fabric and for resisting the temperature and erosion of the exhaust gases, the ablator becomes extremely heavy and this offsets any gains in engine performance.

The present invention overcomes this and other problems by having a rocket engine nozzle skirt woven of metal fibers in the form of two face panels interconnected by numerous drop cords with the outer wall or panel sealed and the inner wall unsealed. The skirt can be inflated with a gas to maintain a rigid shape, and the unsealed wall has a porosity such that the inflation gas bleeds through so as to cool and protect the extension from the hot rocket exhaust gases. The gas source could be from gas bottles or from the engine turbine pump exhaust.

Accordingly, it is an object of the present invention to provide a foldable nozzle extension for a rocket engine which may be inflated.

Another object is to provide a rocket nozzle extension fabricated from woven fibers.

Yet another object is to provide a rocket nozzle extension which may be pressurized and cooled by the engine pump drive turbine exhaust gases.

Other objects and advantages of the present invention will become more apparent from the following detailed description when taken in conjunction with the accompanying drawings.

BRIEF DESCRIPTION OF THE DRAWINGS

FIG. 1 is a view of the nozzle extension of the present invention in a retracted position about the main rocket nozzle;

FIG. 2 is a view of the nozzle extension in an extended position;

DESCRIPTION OF THE PREFERRED EMBODIMENT

Figure 3:
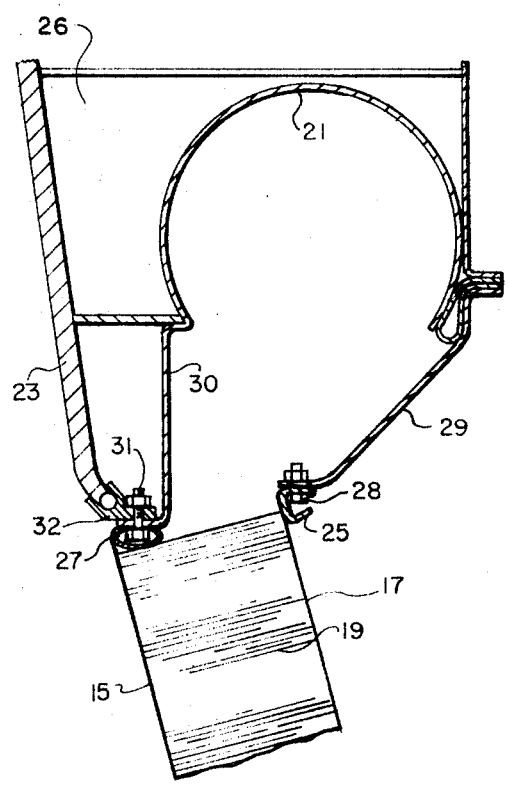
FIG. 3 is a partial sectional view illustrating a typical connection between the turbine exhaust manifold and the nozzle extension.

Referring now to FIG. 1 wherein is illustrated a rocket engine 11 with a nozzle extension 13, according to the present invention, in a retracted position, and to FIG. 2 wherein the nozzle extension 13 is in an extended and inflated position. The nozzle skirt or extension 13 consists of two woven facecloths or panels 15 and 17 interconnected by drop threads 19 so as to form a flexible sandwich structure. The drop threads 19 are woven integrally into each facecloth to form a three-dimensional fabric. The drop thread height can be woven to any preselected length (one inch for example) or altered in length to form varied shapes. The density of the drop thread can also be varied to suit requirements.

A typical yarn suitable for weaving the fabric is type 304 stainless steel, multifilament yarn, made up of 0.5 mil filaments twisted two turns per inch. Depending upon strength requirements, the number of filaments used can be varied. A suitable weave is made using 112 yarns per inch in the warp direction, with each yarn consisting of 90-half-mil filaments, and 80 yarns per inch in the fill direction with each yarn consisting of 300-half-mil filaments, and a drop thread density of 42.5 yarns per square inch with each yarn consisting of 300-half-mil filaments. Such a weave will have a 1 percent porosity which has proven to be satisfactory for transpiration cooling using the pump drive turbine exhaust gases as the pressurizing and coolant medium.

The nozzle extension is a conic section. To fabricate the extension, two methods may be used. In one method, the three-dimensional fabric is woven on a loom as flat stock, and the conic shape is accomplished by cutting gores from the flat material. Each gore is systematically cut in a predetermined number of slices. The slits are tapered in the outer face and spread such as to adjust the circumferential length between the inner and outer face. These slits are then closed using tape made from the same material as the face ply. The tapered slits in the outer face allow the flat three-dimensional material to take a multisided conical shape which approaches a pure cone as the number of slits are increased.

Another method of fabricating the nozzle is to weave the material in a conical configuration. This is accomplished by adjusting the rate of weaving upper and lower faces in a differential fashion and similarly adjusting the rates of weaving the sides of the three-dimensional fabric in a differential fashion such that the material has a conical shape. The two ends of the woven material are then joined along one seam to complete the desired truncated cone.

As shown in FIGS. 2 and 3, the turbine exhaust manifold is located adjacent the exist opening of the main rocket nozzle 23 and supported thereon by a support mount 26 (see FIG. 3). The flexible nozzle skirt 13 has on its front end an outer mounting ring 25 on its outer wall and an inner mounting ring 27 on its inner wall 15. The outer mounting ring 25 is fastened by bolts 28 to an upper transition section 29 extending from the outer part of the manifold 21 and the inner mounting ring 27 is fastened to an inner transition section extended from the inner part of the manifold 21. The inner transition section 30 is held by bolts extending through a flange member 32 fitted on the end of the main rocket nozzle 23. Because the inner and outer walls 15 and 17 of the nozzle extension are of woven metal fibers, they may be welded to their respective mounting ring 25 and 27.

As indicated by FIG. 2, the end edge 35 of the nozzle skirt is enclosed by a portion of a panel of the same weave as the walls but it is in the shape of a toroid.

All but the inner wall 15 of the nozzle skirt 13 is sealed with a silicon elastomer, such as Dow Corning Corporation Silastic-2288. This leaves the inner wall 15 unsealed so that the turbine exhaust gas will cause the interior of the extension to pressurize and leak or transpire through the unsealed weave so as to keep the hot rocket gases away from the fabric, and, thereby keep the inner wall of the extension at tolerable temperature levels.

In operation, the nozzle extension 13 is packaged about the main rocket nozzle 23 as indicated by FIG. 1, and when the rocket starts the turbine exhaust gas is dumped between the face panels 15 and 17 of the extension causing it to inflate to a desired working pressure such that it will become extended as shown by FIG. 2. The porosity of the internal face panel 15 is such that sufficient coolant gas passes through the panel yet causes sufficient build up of internal pressure to maintain mechanical rigidity of the skirt 13.

Thus, it is now apparent that a unique nozzle extension 13 has been disclosed which can be used on an upper stage vehicle without excessive vehicle interstage length and weight. Obviously, many modifications and variations of the present invention are possible in light of the above teachings. It is, therefore, to be understood that within the scope of the appended claims, the invention may be practiced other than as specifically described.

What I claim is:

1. An improved rocket nozzle, comprising:
  a main rocket having a divergent shape nozzle;
  a manifold mounted adjacent the back end of said nozzle, said manifold receiving the exhaust gas from the main rocket turbine;
  a fabric nozzle extension diverging from its forward to rear ends;
  said nozzle having outer and inner wall panels of woven fabrics interconnected by fiber drop threads; said panels being joined at their rear end and having a low porosity;
  said outer and inner wall panels being joined to said turbine exhaust manifold so the gas exhaust thereof will spill between the wall panels and thereby inflate the nozzle extension and give it mechanical rigidity;
  said nozzle extension having its walls sealed except for the inner wall such that the exhaust gas will transpire through it and protect the nozzle from the exhaust gases of the main rocket engine.

2. An improved rocket nozzle according to claim 1 in which the fibers of the woven fabrics and drop threads of the nozzle extension are metal.

3. An improved rocket nozzle according to claim 2 in which said sealed walls are sealed with a silicon elastomeric material and the metal woven fibers and drop threads are of stainless steel.

4. An improved nozzle extension for a rocket engine, comprising:
  a fabric sandwich construction having a divergent opening extending from its front to rear ends;
  said construction having an outer wall panel of woven fabric and an inner wall of woven fabric interconnected by drop threads, said panels being joined at their rear end and having a low porosity;
  said outer panel being sealed and said inner panel being unsealed.

5. An improved nozzle extension according to claim 4 wherein said fabric and drop threads are woven from stainless steel multifilament yarn.

6. An improved nozzle extension according to claim 5 wherein said multifilament yarn is made of 0.5 mil filaments twisted two turns per inch.

7. An improved nozzle extension according to claim 5 in which the fabric is made using about 112 yarns per inch in the warp direction with each yarn consisting of about 90-half-mil filaments, and about 80 yarns per inch in the fill direction with each yarn consisting of about 300-half-mil filaments, and a drop thread density of about 42.5 yarns per square inch with each yarn consisting of about 300-half-mil filaments such that a panel porosity of about 1 percent is achieved.

8. An improved nozzle extension according to claim 5 wherein said outer panel is sealed with a silicon elastomeric material.

9. An improved nozzle extension according to claim 4 including a mounting ring joined to the front end of the outer panel and a mounting ring joined to the front end of the inner panel.

10. An improved nozzle extension according to claim 4 including means for inflating said sandwich construction with a gas such that it will become mechanically rigid and the gas will bleed through the unsealed inner panel.

PO-1050
(5/69)

UNITED STATES PATENT OFFICE
CERTIFICATE OF CORRECTION

Patent No. 3,596,465          Dated August 3, 1971

Inventor(s) Thomas O. Paine, Administrator of NASA

It is certified that error appears in the above-identified patent and that said Letters Patent are hereby corrected as shown below:

In the specification, column 1, before "BACKGROUND OF THE INVENTION" insert the following heading and paragraph.

ORIGIN OF THE INVENTION

The invention described herein was made in the performance of work under NASA contracts and is subject to the provisions of Section 305 of the National Aeronautics and Space Act of 1958, Public Law 85-568 (72 Stat. 435, 42 U.S.C. 2457).

Signed and sealed this 11th day of January 1972.

(SEAL)
Attest:

EDWARD M. FLETCHER, JR.      ROBERT GOTTSCHALK
Attesting Officer                 Acting Commissioner of Patents